Sept. 1, 1959  J. J. HUEY  2,901,898
BEARING AND COUPLING ASSEMBLY FOR ROLL FEEDERS AND THE LIKE
Filed Nov. 13, 1957  2 Sheets-Sheet 1

INVENTOR.
John J. Huey
BY

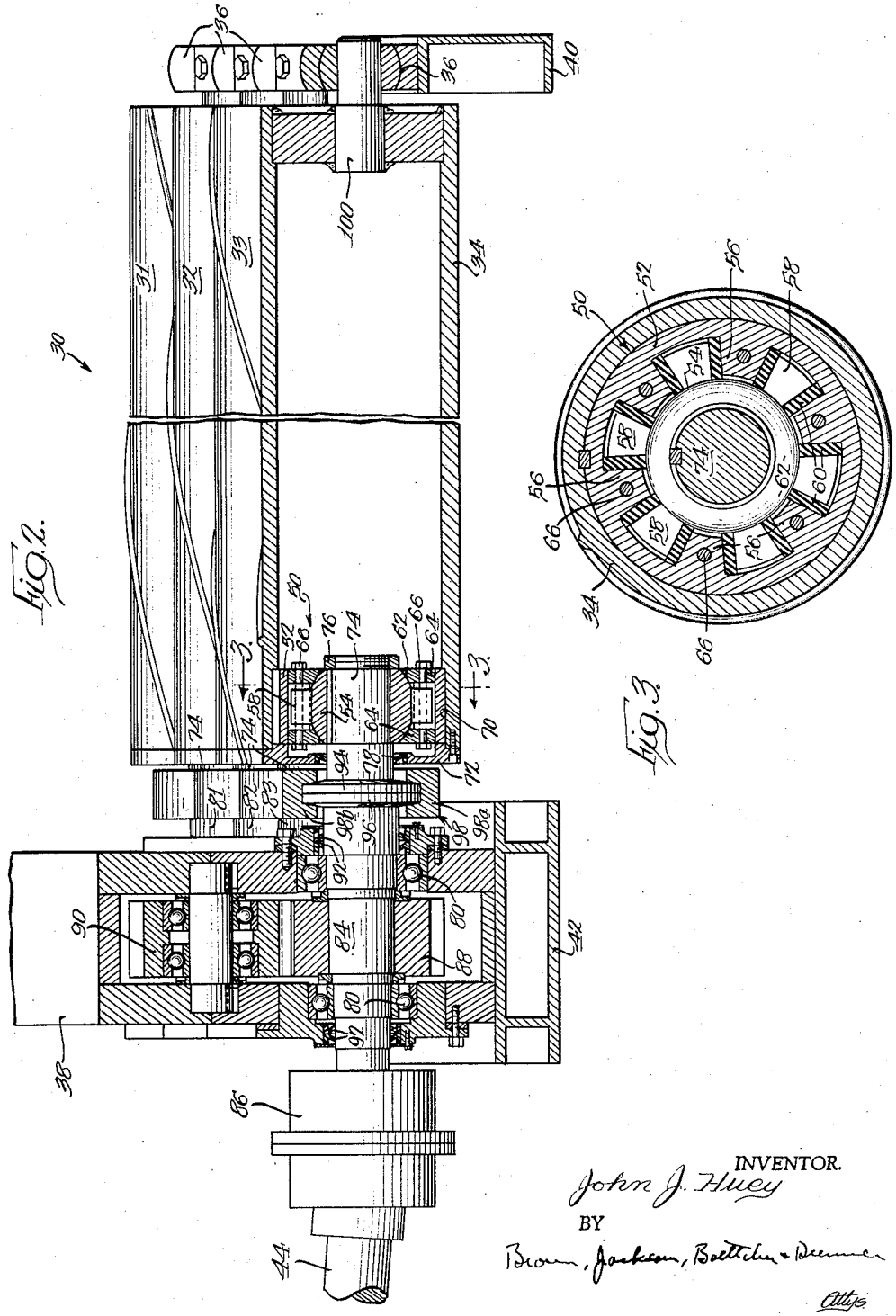

United States Patent Office 2,901,898
Patented Sept. 1, 1959

2,901,898
BEARING AND COUPLING ASSEMBLY FOR ROLL FEEDERS AND THE LIKE

John J. Huey, Elmhurst, Ill., assignor to The United Electric Coal Companies, Chicago, Ill., a corporation of Delaware Application November 13, 1957, Serial No. 696,240

6 Claims. (Cl. 64—14)

The present invention relates to drive couplings, and particularly, to an improved bearing and coupling assembly for connecting a driven element subject to severe service to its driving element and for mitigating transmission of impact or shock from the driven element to the drive element.

In the co-pending applications of Frank F. Kolbe, Serial No. 390,454, filed November 6, 1953, now Patent No. 2,826,839, and Serial No. 696,227, filed November 13, 1957, which are assigned to the assignee of the present application, there are disclosed several embodiments of roll feeders for excavating apparatus of the bucket wheel type. The purpose of these feeders is to receive thereon excavated earth gravitating out of the buckets of the wheel and to transfer the earth laterally from the interior of the wheel onto a conveyor belt that extends generally parallel to the wheel and rearwardly from its side to a point of disposal of the excavated earth. Each feeder comprises a series of parallel rollers disposed horizontally above the wheel axle and means for rotating the rollers in such manner that the upper surfaces thereof move toward the belt to effect the described transfer. In one embodiment of the excavating apparatus, the wheel is 22 feet in diameter and carries eight buckets each having a capacity of about three cubic yards. The buckets scoop up large quantities of earth, including large lumps of clay and frozen earth and large rocks, and subsequently drop their loads a substantial distance onto the rollers of the roll feeder. The rollers are therefore subject to severe shock and impact loading which causes the rollers to flex and yield and to halt momentarily or abruptly speed up. Also, in some embodiments (the earlier ones), there is a tendency for stones and the like to become wedged between adjacent rollers, whereby a force tending to separate or cause flexure of the rollers is exerted thereon. Each roller is supported at one end in a bearing and is connected at its opposite end to the drive means therefor, such as a gear box, and it has been a common occurrence for the roller bearings and drive gears to fail in service due to the transmission thereto of the forces to which the roller is subject.

The object of the present invention is to provide an improved coupling and bearing assembly for the feed rollers described, and for apparatus subject to analogous service, which operatively connects the roller to its drive element or elements, yet effectively isolates the drive element or elements from the abusive service to which the roller is subjected.

Another object of the invention is the provision of an improved coupling and bearing assembly of the character described which accommodates flexure of the roller relative to its drive means and also absorbs and cushions differentials in torque thereby effectively to isolate the roller drive means from the impacts and shocks imparted to and absorbed by the roller or the like.

More specifically, it is an object of the invention to provide an improved bearing and coupling assembly including a pair of toothed elements loosely meshed with one another, and resilient means between the teeth of the elements for establishing a strong drive connection therebetween and yet accommodating relative rotation of the two thereby to absorb torque differentials therebetween, the two elements including complementary spherical bearing surfaces accommodating relative swiveling movement to permit angular offset of the two elements and the instrumentalities connected thereby.

A further object of the invention is the provision of an improved bearing and coupling assembly as defined wherein the resilient means cushions both relative circumferential and relative angular movement between the two elements and automatically centers the two elements relative to one another both circumferentially and angularly.

A still further object of the invention is the provision of an improved bearing and coupling assembly of particularly compact and economical construction including an outer ring having radially inwardly extending teeth, an inner ring confined within the outer ring and having radially outwardly extending teeth meshed loosely with the teeth of the outer ring, and resilient pads filling the space circumferentially between the teeth of the two rings and the space radially between the root circles of the two rings, the inner ring including a spherical bearing surface facing toward the outer ring and the outer ring carrying complementary bearing means journalled on said spherical surface thereby to mount the rings for relative circumferential and angular movement, the resilient pads being compressed upon occurrence of relative movement and thereupon exerting a returning or centering force on the rings.

By virtue of the described construction, the bearing and coupling means of the present invention serves to mitigate transmission of impacts and shocks from the roller to the roller drive means and accommodates angular offset of the roller relative to the drive, thereby effectively to isolate the drive means from the shock loading of the roller while at the same time establishing a drive connection therebetween. Consequently, the drive means is afforded a long service life and does not suffer relatively frequent failure as was heretofore the case. This is of particular advantage in excavating apparatus of the type referred to, as down-time of the excavator, to accommodate repair of the feeder, is exceedingly expensive. The cost of the excavator alone, even when idle, is estimated to be $60.00 per hour, and idling of the excavator results in idling its crew and the machines and crews of other units working in conjunction therewith, thereby severely curtailing production. The cost factor is especially amplified when it is considered that replacement or repair of the drive means for the roll feeder necessarily consumes many hours. Thus, the present invention results in substantial savings, not only in the cost of repair and replacement of the feeder parts, but in eliminating down-time on the excavator.

Other objects and advantages of the present invention will become apparent in the following detailed description of a preferred embodiment of the invention.

Now, in order to acquaint those skilled in the art with the bearing and coupling assembly of my invention, I shall describe, in connection with the accompanying drawings, a preferred embodiment of the assembly and a preferred manner of making and using the same.

In the drawings:

Figure 2 is a side view of the roll feeder showing the outboard roller, its bearings and drive connections and my improved bearing and coupling assembly in longitudinal section; and Figure 3 is a cross-setional view of my bearing and coupling assembly taken substantially on line 3—3 of Figure 2.

Figure 1:
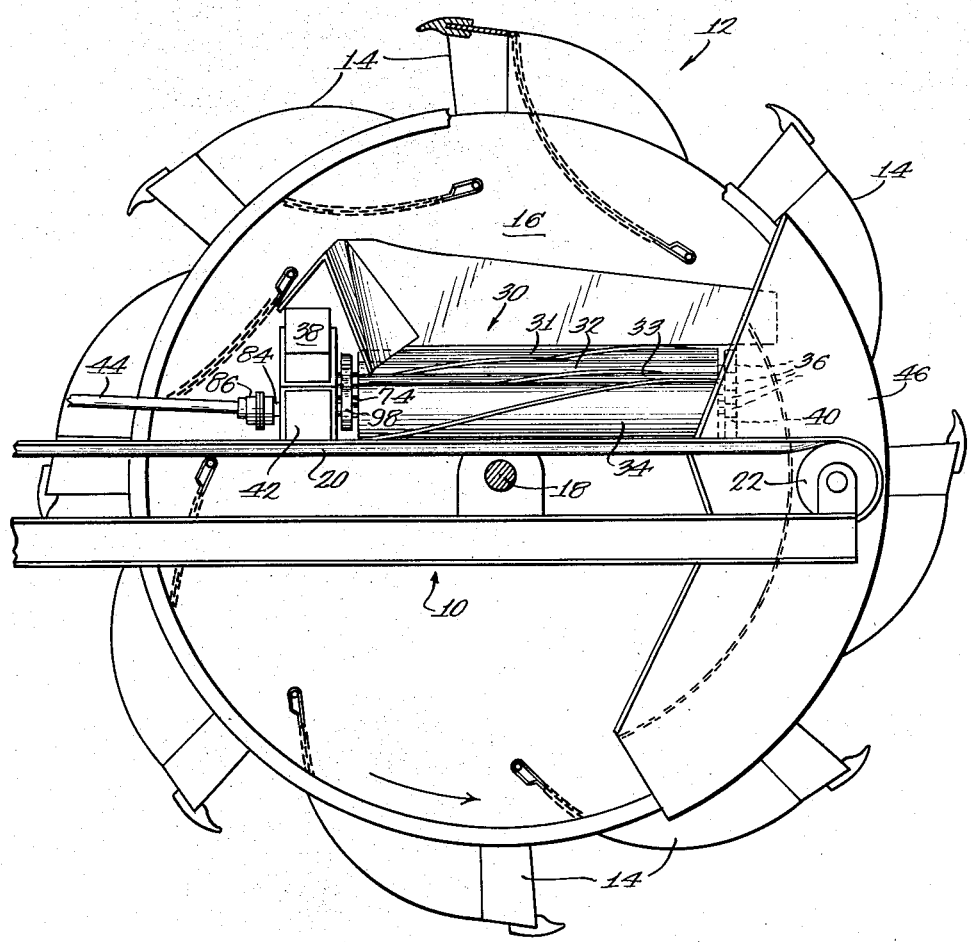
Figure 1 is a side elevation of the digging wheel of an excavator of the type referred to herein, the view showing the relationship of the wheel, the roll feeder and belt conveyor.

Referring now to the drawings, and particularly to Figure 1, I have illustrated the digging wheel end of an excavating apparatus of the character to which I have had reference. As shown, the excavator includes a vertically adjustable and horizontally oscillatable digging ladder 10 rotatably mounting at its free end a digging wheel 12 which carries at its periphery a plurality of circumferentially spaced digging buckets 14. The buckets may be any one of the types disclosed in the co-pending applications of Frank F. Kolbe, Serial, No. 585,335, filed May 16, 1956, now Patent No. 2,834,127, and Serial No. 586,806, filed May 23, 1956, now Patent No. 2,834,128, to which reference is made for a more complete disclosure. The wheel 12 is open at one side and is closed at its other side by a wall 16 by means of which the wheel is mounted on its axle 18.

Adjacent the open side of the wheel, the ladder 10 mounts an endless conveyor belt 20 which extends rearwardly from the side of the wheel in generally parallel relation thereto. The conveyor may lead directly to a point of disposal, or may lead to other conveyors or the like that ultimately lead to a point of disposal. The conveyor 20 is supported at its forward end by an idler pulley 22 which mounts the belt with its carrying run extending above the axle 22 of the wheel and its return run extending beneath the axle. Rearwardly of the pulley, the carrying run of the belt is preferably supported by troughing idler assemblies (not shown) and the belt may suitably be driven adjacent its rearward end by any conventional means.

The digging ladder also supports, immediately above the axle 18 and the belt 20, a roll feeder 30 which extends from adjacent the closed side of the wheel to a position above the edge portion of the conveyor 20 that is disposed adjacent the wheel. The feeder is of the type shown in the co-pending applications of Frank F. Kolbe, Serial No. 390,454, filed November 6, 1953, now Patent No. 2,826,839, and Serial No. 696,227, filed November 13, 1957, and is preferably of the specific construction disclosed in the latter application. The feeder includes a series of substantially parallel cylindrical rollers 31, 32, 33 and 34 which are disposed horizontally in substantially parallel relation to the wheel and the conveyor, the innermost roller of the series being disposed adjacent the wall 16 of the wheel and the outermost roller being disposed above the adjacent edge portion of the belt 20. The rollers are rotatably supported at one set of ends by bearings 36 and are rotatably supported at their other set of ends, in the manner to be described, by a gear box 38, the bearings 36 and box 38 being mounted by bases 40 and 42, respectively, on the digging ladder 10.

The rollers are adapted to be driven in the direction to feed excavated earth onto the conveyor 20 by means of a suitable prime mover (not shown) which actuates a drive shaft 44 that is coupled to the roller 34. The gear box 38 houses a gear transmission by means of which the rollers 31, 32 and 33 are driven from the shaft 44, preferably at such rate of speed as to cause the rollers to rotate at progressively increasing peripheral speeds from the innermost or inboard roller 31 to the outermost or outboard roller 34.

In use of the excavating apparatus shown, the wheel is rotated in the direction illustrated by the arrow in Figure 1 and moved horizontally into a bank of earth to cause the buckets 14 thereof to scoop up large quantities of earth and to carry the excavated earth upwardly. To insure retention of earth in the buckets during their upward travel, the wheel is equipped at its forward portion with a stationary plug 46 which effectively closes the bottom of each bucket during its movement upwardly to a point slightly above the horizontal plane of the wheel axle. At this point, the plug terminates to permit the excavated earth to gravitate out of the respective bucket into the interior of the wheel. The excavated material drops from each bucket onto the rollers of the roll feeder 30 and the rollers feed the earth laterally out of the interior of the wheel onto the upper run of the conveyor 20, which then carries the material rearwardly and deposits the same on a spoil pile.

The wheel 12, in one embodiment, is 22 feet in diameter and each bucket thereof has a capacity of about three cubic yards. Consequently, in operation of the wheel, in all seasons of the year and in all climates, the buckets scoop up a wide variety of earth materials, including among others, large lumps of mud, clay and frozen earth, and large rocks and stones. As each bucket reaches discharge position, the excavated material therein gravitates onto the roll feeder 30, with substantial impact, especially when each bucket discharges a large lump of clay or frozen earth, or a large rock. It is essential, therefore, that the roll feeder absorb the impact consequentl upon this vertical drop without damage thereto so that the feeder may subsequently transfer the excavated material onto the conveyor belt. Also, there may at times be a tendency for excavated material to drop or wedge into the space between adjacent rollers, whereupon the rollers tend to spread apart and flex intermediate their points of rigid support. It is apparent, therefore, that the nature of the service requires the feeder to meet rigid specifications.

In view of the above described shock or impact loading of the rollers, and the other factors tending to cause flexure and displacement of the rollers, roll feeders have, prior to my invention, been subject to frequent breakdown due to destruction of the roller supporting bearings and the gear train provided within the gear box 38. To overcome these disadvantages, the present invention provides an improved coupling and bearing assembly for supporting each roller at one of its ends and for connecting each roller to its drive shaft, a preferred embodiment of which assembly is illustrated in Figures 2 and 3.

Referring to Figures 2 and 3, my improved bearing and coupling assembly, which is indicated generally at 50, is housed entirely within one end of the roller, which is customarily hollow. The assembly comprises a pair of concentric rings 52 and 54, the inner one 54 of which is confined within the outer ring 52. The outer ring 52 includes radially inwardly extending teeth 56 which terminate short of the body of the ring 54, and the ring 54 includes radially outward extending teeth 58 which mesh loosely with the teeth 56 and terminate short of the body of the ring 52. The sides of the teeth 56 and 58 are preferably radial, and the teeth of each set are narrower than the spaces between the adjacent teeth whereby, when the two sets of teeth are meshed, relatively large spaces are provided circumferentially between adjacent teeth. By virtue of the concentric assembly of the rings and the radial extent of the teeth, these spaces are provided without sacrificing tooth strength.

In each of the spaces thus defined, there is disposed a cushioning means, in the form preferably of a pad 60 of resilient material. While the pads may be made from a variety of products, I prefer a rugged material of long service life comprising a fabric reinforced rubber or synthetic material available under the name "Fabreeka." Each of the pads 60 is of a size snugly to fill the space within which it is inserted, i.e., the space between adjacent ones of the teeth 56 and 58 and between the root circles of the rings 52 and 54; the pads being of a width equal substantially to that of the teeth 56 which, as shown in Figure 2, are quite wide.

Radially inwardly of the teeth thereof, and to opposite sides of the teeth, the inner ring 54 of the assembly includes outwardly facing convex surfaces constituting portions of a spherical bearing 62. The outer ring 52 is journaled on this bearing by means of a pair of annuluses 64 which are secured to opposite sides of the teeth 56 of the outer ring. At the inner margins thereof, the annuluses 64 are provided with spherical surfaces complementary to and engaging on the bearing 62 to opposite sides of the teeth 56 and 58, thereby to mount the outer ring on the inner ring for both circumferential and angular movement. The annuluses 64 are mounted within the interior of the body of the outer ring 52 and are fixedly secured to the ring by bolts 66 extending through the teeth 56 of the ring. The annuluses and bolts thus also serve to maintain the two rings in assembled relation.

To accommodate relative angular movement of the two rings, the teeth 58 of the inner ring are of a width less than that of the teeth of the outer ring to provide clearance between the teeth 58 and the annuluses 64. Due to this clearance, and the clearance between the ends of the teeth 56 and 58 and the rings 54 and 52, respectively, the two rings are capable of substantial angular relative movement.

The resilient pads 60 serve to resist and cushion both the relative angular and circumferential movements above described. The cushioning effect circumferentially is obvious. Concerning the action of the pads upon relative angular movement of the rings, it is to be observed that the root circle portions or surfaces of the two rings and the spherical bearing surfaces are so formed relative to one another that they are not complementary or co-extensive. Secondly, the pads 60 snugly engage the root circle surfaces of the two rings at their opposite ends. Consequently, upon relative angular movement of the rings, portions of each pad will be compressed, thereby to cushion the movement. Due to this cushioning action, and the fact that the pads are snugly fitted between the rings, the pads also exert returning forces on the rings causing the rings to be normally centered relative to one another. It is apparent therefore that the present invention provides a compact, sturdy and economical coupling and bearing assembly accommodating relative angular and circumferential movement of the rings 52 and 54 and normally centering the rings relative to one another.

In use, one of the two rings is secured to a drive element and the other to a driven element to establish a strong driving connection therebetween, and yet accommodate relative movement of the driving and driven elements both circumferentially and angularly, thereby effectively to isolate the drive element from abusive service to which the driven element may be subjected. In the specific environment dealt with herein, a bearing and coupling assembly 50 is inserted snugly into a counterbore 70 provided at the gear box end of each of the rollers 31, 32, 33 and 34. The outer ring 52 of each assembly is keyed or otherwise secured to the roller and the assembly is held within the roller by a retaining ring 72 secured, as by bolts, to the roller and engaging against the outer ring 52. The inner ring 54 is keyed or otherwise secured to a stub shaft 74, the ring preferably being confined between a shoulder on the shaft and a nut 76 threaded to the end of the shaft within the roller. Suitably, the stub shaft is secured to the inner ring 54 prior to insertion of the assembly 50 into the roller. The stub shaft 74 extends to the exterior of the roller through an enlarged central aperture in the retaining ring 72, the space between the edge of the aperture and the shaft being closed by a flexible sealing ring 78 which accommodates relative angular movement between the roller and the stub shaft while sealing the assembly 50 from contamination.

Each of the stub shafts 74 is, in turn, coupled to a drive shaft which is rotatably mounted, by means of bearings 80, in the gear box 38. In the case of the outboard roller 34, the drive shaft, indicated at 84, constitutes a power input to the gear box and thus extends to opposite sides of the box. At the side of the box opposite the rollers, the shaft 84 is connected by a universal 86 to the power or drive shaft 44 to be rotated thereby. Within the gear box, the shaft 84 carries a gear 88, and each of the remaining drive shafts for the rollers, as indicated at 81, 82 and 83, carries a similar gear (not shown). These gears are interconnected for rotation in the same direction by idler gears, one of which is shown at 90. The shafts 81—84 which extend to the exterior of the gear box are sealed relative thereto by flexible sealing rings 92. To couple the stub shaft 74 to its drive shaft 84, and similarly to connect the rollers 31, 32 and 33 to their drive shafts 81, 82 and 83, respectively, the two shafts to be coupled are provided at their adjacent ends with opposed flanges 94 and 96, respectively. Each flange includes an outer radial face and an inner tapered face and the two flanges are secured together by a split collar 98 having opposed inwardly divergent interior surfaces complementary to the tapered surfaces of the flanges 94 and 96. Consequently, when the two halves 98a and 98b of the collar are drawn toward one another, suitably by bolts (not shown), the collar effectively cams the two flanges into tightly abutting relation thereby to lock the shafts 74 and 84 together.

In use of the roll feeder described, the bearing and coupling assemblies of the present invention accommodate flexure of the rollers relative to their drive shafts and absorb the impact occasioned upon the dropping of excavated material onto the rollers. Flexure of the rollers due to other causes is also accommodated without stressing the drive shaft or forcing the same out of alignment relative to the gear box. Likewise, momentary halting or abrupt speed up of the rollers, due to the angle at which descending material strikes the rollers, is accommodated by relative circumferential movement of the rings 52 and 54. The assemblies 50 thus effectively isolate the gear box and drive train from the shock loading and impacts to which the rollers are subject, thereby to increase the service life of the feeder. In actual service over several months, the bearing and coupling assemblies of the present invention have suffered no breakdown and have been at least an assisting factor in producing a roll feeder that has suffered no mechanical failures in the several months it has been in use and that has not, on its own account, caused or resulted in down-time of the excavator.

Moreover, my bearing and coupling assemblies perform the above enumerated functions so well that it has been found necessary to install only a simple form of support at the other end of each roller, namely, a stub shaft 100 welded directly to the roller and journaled in the respective bearing 36.

In view of the foregoing, it is to be appreciated that the present invention, by increasing the service life of the drive train and bearings of the roll feeder, results in substantial savings consequent upon appreciable decrease in down-time on the excavator. These or similar results are likewise obtainable by my coupling assembly when applied to the solution of other problems concerning detachable connection of two elements and isolation of one element from the abusive service to which the other may be subject. Thus, the objects of the invention are seen to be attained in a convenient, practical and economical manner.

While I have shown and described what I believe to be the preferred embodiment of my invention, it is to be appreciated that various changes, rearrangements and modifications may be made therein without departing from the scope of the invention, as defined by the appended claims.

I claim:

1. A bearing and coupling assembly comprising a pair of coaxial elements having concentric root circle surfaces and complementary inter-engaging teeth extending respectively from said surfaces and connecting the elements for normally conjoint rotation, the teeth on each element normally being spaced from the teeth on the other element to accommodate limited relative circumferential movement of said elements, said elements including mutually engaging complementary spherical bearing surfaces accommodating relative angular movement of said elements, said bearing surfaces being non-coextensive with said root circle surfaces of the two elements, and cushioning means in the spaces between adjacent teeth on the two elements and in the space between said root circle surfaces of said elements for resisting both relative circumferential and angular movement of said elements.

2. A bearing and coupling assembly comprising an outer ring having radially inwardly extending teeth, an inner ring confined within the outer ring and having radially outwardly extending teeth meshed loosely with the teeth of the outer ring, and resilient pads filling the space circumferentially between the teeth of the two rings and the space radially between the root circles of the two rings, the inner ring including a spherical bearing surface facing toward the outer ring and the outer ring carrying complementary bearing means journaled on said spherical surface for mounting the rings for relative circumferential and angular movement, said bearing surface and said bearing means being non-coextensive with the root circles of said rings, said resilient pads normally centering said rings relative to one another and being compressed upon occurrence of relative movement thereof for cushioning shocks imparted to said rings and for exerting a returning force on said rings.

3. A bearing and coupling assembly comprising a pair of rings having concentric root circle surfaces, the outer one of said rings having a plurality of teeth extending radially inwardly from the root circle surface thereof, the inner one of said rings having a plurality of teeth extending radially outwardly from the root circle surface thereof, the teeth on said inner ring being generally complementary to and meshed loosely with the teeth on said outer ring to accommodate relative circumferential and angular movement of the rings, the teeth on each ring normally being spaced circumferentially from the teeth on the other ring and radially from the root circle surface of the other ring, said rings having complementary mutually engaging spherical bearing surfaces the center of which is located on the axis of said rings, said bearing surfaces mounting said rings for relative circumferential and angular movement and being non-coextensive with said root circle surfaces of the two rings, and a resilient pad fitted snugly into each space defined between adjacent teeth and said root circle surfaces on the two rings, said pads resisting and cushioning relative movement of said rings and normally centering said rings both circumferentially and angularly relative to one another.

4. A bearing and coupling assembly comprising a pair of rings having concentric root circle surfaces, the outer one of said rings having a plurality of teeth extending radially inwardly from the root circle surface thereof, the inner one of said rings having a plurality of teeth extending radially outwardly from the root circle surface thereof, the teeth on said inner ring being generally complementary to and meshed loosely with the teeth on said outer ring to accommodate relative circumferential and angular movement of the rings, the teeth on each ring normally being spaced circumferentially from the teeth on the other ring and radially from the root circle surface of the other ring, said inner ring radially inwardly and to opposite sides of the teeth thereon including outwardly facing convex surfaces defining a spherical bearing having its center located on the axis of said ring, a pair of annuluses secured to said outer ring to the opposite sides of the teeth thereof and in axially spaced relation to the teeth on said inner ring, said annuluses at the inner margins thereof including parti-spherical surfaces complementary to and engaging on said spherical bearing surfaces of said inner ring, said annuluses retaining said inner ring within said outer ring and mounting said rings for relative circumferential and angular movement, said spherical bearing surfaces being non-coextensive with said root circle surfaces of the two rings, and a resilient pad fitted snugly into each space defined between adjacent teeth and said root circle surfaces of the two rings, said pads resisting and cushioning relative movement of said rings and normally centering said rings both circumferentially and angularly relative to one another.

5. In a roll feeder for excavating apparatus of the bucket wheel type having a plurality of hollow rollers and drive means therefor, the improvement consisting of a bearing and coupling assembly for connecting each roller to its drive means, comprising a pair of concentric rings positioned within one end of the roller, the outer one of said rings being secured to the roller and the inner one of said rings being secured to the drive means for the roller, said rings including, respectively, radially inwardly and radially outwardly facing complementary spherical bearing surfaces the center of which is located on the axis of the roller and its drive means, said bearing surfaces mounting said elements, and thereby the roller and drive means, for relative circumferential and angular movement, said rings including generally concentric root circle surfaces and generally complementary teeth extending, respectively, radially inwardly and radially outwardly from the respective root circle surface, said teeth being loosely meshed with one another and being spaced radially, respectively, from the root circle surface of the other ring to accommodate limited relative movement of said rings both circumferentially and radially, said root circle surfaces being non-coextensive with said bearing surfaces, and a resilient pad snugly fitted in each of the spaces between adjacent teeth and the root circle surfaces of said rings, said teeth and said pads connecting said rings, and thereby the roller and its drive means, for conjoint rotation, said pads accommodating and cushioning relative circumferential and angular movement between said rings and normally centering said rings relative to one another, whereby said rings operatively connect the roller and its drive means, yet effectively isolate the drive means from the abusive service to which the roller is subject.

6. In a roll feeder for excavating apparatus of the bucket wheel type having a plurality of hollow rollers and a drive shaft for each roller, the improvement consisting of a bearing and coupling assembly for connecting each roller to its drive shaft, comprising a pair of concentric rings fitted within one end of the roller, the outer one of said rings being secured to the roller and having a plurality of radially inwardly extending teeth, the inner one of said rings having a plurality of radially outwardly extending teeth generally complementary to and meshed loosely with the teeth on said outer ring to accommodate relative circumferential and angular movement of the rings, the teeth on each ring normally being spaced circumferentially from the teeth on the other ring and radially from the root circle surface of the other ring, said inner ring radially inwardly and to opposite sides of the teeth thereon including outwardly facing convex surfaces defining a spherical bearing having its center located on the axis of said rings, a pair of annuluses secured to said outer ring to the opposite sides of the teeth thereof and in axially spaced relation to the teeth on said inner ring, said annuluses at the inner margin thereof including parti-spherical surfaces complementary to and engaging on said spherical bearing surfaces of said inner ring, said annuluses retaining said inner ring within said outer ring and mounting said rings for relative circumferential and angular movement, said spherical bearing surfaces being non-coextensive with the root circle surfaces of the two rings, a resilient pad fitted snugly into each space defined between adjacent teeth and the root circle surfaces on the two rings, said pads resisting and cushioning relative movement of said rings and normally centering said rings both circumferentially and angularly relative to one another, a stub shaft secured to said inner ring and extending axially to the exterior of the roller, said stub shaft being secured at its outer end to the drive shaft for the roller, a retaining ring secured to the outer end of the roller and engaging said outer ring for retaining said assembly in the roller, said retaining ring having an enlarged central aperture accommodating free passage therethrough of said stub shaft, and a flexible seal closing the annular space between said stub shaft and said retaining ring, said assembly thereby operatively connecting the roller and its drive shaft and accommodating relative circumferential and angular movement therebetween, whereby said assembly effectively isolates the drive shaft from the abusive service to which the roll is subject.

References Cited in the file of this patent

UNITED STATES PATENTS

| | | |
|---|---|---|
| 1,322,341 | Ream | Nov. 18, 1919 |
| 1,426,009 | Rantsch | Aug. 15, 1922 |
| 1,868,163 | Evans | July 19, 1932 |
| 2,219,142 | Williams | Oct. 22, 1940 |
| 2,318,039 | Wood | May 4, 1943 |
| 2,739,462 | Wincenciak | Mar. 27, 1956 |

FOREIGN PATENTS

| | | |
|---|---|---|
| 538,096 | Great Britain | July 21, 1941 |